United States Patent
Vaquero et al.

(10) Patent No.: US 11,636,572 B2
(45) Date of Patent: Apr. 25, 2023

(54) METHOD AND APPARATUS FOR DETERMINING AND VARYING THE PANNING SPEED OF AN IMAGE BASED ON SALIENCY

(71) Applicant: Nokia Technologies Oy, Espoo (FI)

(72) Inventors: Daniel Andre Vaquero, Sunnyvale, CA (US); Muninder Veldandi, Sunnyvale, CA (US); Basavaraja Vandrotti, Sunnyvale, CA (US); Arto Lehtiniemi, Lempäälä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 35 days.

(21) Appl. No.: 15/394,176

(22) Filed: Dec. 29, 2016

(65) Prior Publication Data

US 2018/0189928 A1 Jul. 5, 2018

(51) Int. Cl.
*G06T 3/20* (2006.01)
*G06F 3/04883* (2022.01)
(Continued)

(52) U.S. Cl.
CPC .............. *G06T 3/20* (2013.01); *G06F 3/0485* (2013.01); *G06F 3/0488* (2013.01);
(Continued)

(58) Field of Classification Search
CPC .. G06T 3/20; H04N 5/23216; H04N 5/23238; H04N 5/23293; G06F 3/0488; G06F 3/0485
See application file for complete search history.

(56) References Cited

U.S. PATENT DOCUMENTS 7,015,954 B1 3/2006 Foote et al.
7,940,264 B2 5/2011 Jojic et al.
(Continued)

FOREIGN PATENT DOCUMENTS

EP 2 779 621 A1 9/2014
GB 2 477 793 A 8/2011
(Continued)

OTHER PUBLICATIONS

Goferman, S. et al., *Context-Aware Saliency Detection*, IEEE Trans. Pattern Anal. Mach. Intell. 34, 10 (Oct. 2012) pp. 1915-1926.
(Continued)

*Primary Examiner* — Tat C Chio
(74) *Attorney, Agent, or Firm* — Alston & Bird LLP

(57) ABSTRACT

A method, apparatus and computer program product are provided for varying panning speeds of images based on saliency such that 360-degree images, panoramic images, video images and/or other wide view area images may be efficiently displayed by varying the panning speed such that the user focuses on salient portions of the image. A panning speed is determined based on the currently displayed area and its saliency relative to the saliency of non-displayed or peripheral portions. As a user pans from one area to another, while the user pans over a salient portion of the image, the actual reflected panning may occur at a relatively slower speed than when the user pans over an area not including a salient portion, or a less salient portion.

18 Claims, 4 Drawing Sheets

(51) Int. Cl.
| | |
|---|---|
| *H04N 21/431* | (2011.01) |
| *H04N 21/44* | (2011.01) |
| *H04N 5/232* | (2006.01) |
| *G06V 10/25* | (2022.01) |
| *G06F 3/0485* | (2022.01) |
| *G06F 3/0488* | (2022.01) |
| *G06V 10/46* | (2022.01) |

(52) U.S. Cl.
CPC .......... *G06F 3/04883* (2013.01); *G06V 10/25* (2022.01); *H04N 5/23216* (2013.01); *H04N 5/23238* (2013.01); *H04N 5/232945* (2018.08); *H04N 21/4318* (2013.01); *H04N 21/44008* (2013.01); *G06V 10/462* (2022.01)

(56) References Cited

U.S. PATENT DOCUMENTS

| | | | |
|---|---|---|---|
| 8,018,493 | B2 | 9/2011 | Sakaue et al. |
| 8,401,979 | B2 | 3/2013 | Zhang et al. |
| 8,417,058 | B2 | 4/2013 | Tardif |
| 8,811,711 | B2 | 8/2014 | Calman et al. |
| 8,990,128 | B2 | 3/2015 | He et al. |
| 9,224,036 | B2 | 12/2015 | Horowitz |
| 2003/0235344 | A1 | 12/2003 | Kang et al. |
| 2004/0066449 | A1 | 4/2004 | Givon |
| 2006/0268360 | A1 | 11/2006 | Jones |
| 2007/0024701 | A1 | 2/2007 | Prechtl et al. |
| 2008/0025639 | A1* | 1/2008 | Widdowson ......... G06K 9/3208 382/284 |
| 2010/0045774 | A1 | 2/2010 | Len et al. |
| 2010/0086200 | A1 | 4/2010 | Stankiewicz et al. |
| 2010/0329588 | A1 | 12/2010 | Cheatle |
| 2011/0287811 | A1 | 11/2011 | Mattila et al. |
| 2013/0124951 | A1* | 5/2013 | Shechtman ............. G06T 13/80 715/201 |
| 2013/0294709 | A1 | 11/2013 | Bogart et al. |
| 2014/0049536 | A1 | 2/2014 | Neuman et al. |
| 2014/0189476 | A1* | 7/2014 | Berthelot ............... G06F 17/212 715/202 |
| 2014/0191964 | A1 | 7/2014 | McDonald et al. |
| 2014/0282223 | A1* | 9/2014 | Bastien ................. G06F 3/0485 715/784 |
| 2014/0354768 | A1 | 12/2014 | Mei et al. |
| 2015/0054913 | A1 | 2/2015 | Annau et al. |
| 2015/0117783 | A1 | 4/2015 | Lin et al. |
| 2015/0130799 | A1 | 5/2015 | Holzer et al. |
| 2015/0269785 | A1 | 9/2015 | Bell et al. |
| 2015/0379086 | A1 | 12/2015 | Sheridan et al. |
| 2016/0088280 | A1 | 3/2016 | Sadi et al. |
| 2016/0170584 | A1* | 6/2016 | Kumar .................... G06F 3/013 715/811 |
| 2016/0335981 | A1* | 11/2016 | Koo ........................ G09G 5/003 |
| 2017/0200472 | A1* | 7/2017 | Munukutla ........ G06K 9/00744 |
| 2017/0332064 | A1* | 11/2017 | Martineau ............. G06T 19/006 |

FOREIGN PATENT DOCUMENTS

| | | |
|---|---|---|
| WO | WO 2014/072567 A1 | 5/2014 |
| WO | WO 2015/155406 A1 | 10/2015 |
| WO | WO 2016/055688 A1 | 4/2016 |

OTHER PUBLICATIONS

Marchesotti, L. et al., *Assessing the Aesthetic Quality of Photographs Using Generic Image Descriptors*, International Conference on Computer Vision (ICCV '11), Washington, DC (2011) pp. 1784-1791.

Argyriou, A. et al., Convex Multi-Task Feature Learning, Mach. Learn. 73, 3 (Dec. 2008) 243-272.

Camera Calibration and 3D Reconstruction [online] [retrieved Mar. 7, 2016]. Retrieved from the Internet: <URL: http://docs.opencv.org/2.4/modules/calib3d/doc/camera_calibration_and_3d_reconstruction.html>. 35 pages.

CENTR: An Embedded Vision Case Study Winner [online] [retrieved Oct. 20, 2015]. Retrieved from the Internet: <URL: http://www.embedded-vision.com/industry-analysis/technical-articles/2014/05/13/centr-embedded-vision-case-study-winner>. 4 pages.

Chang, Y.-Y. et al., Finding Good Composition in Panoramic Images, International Conference on Computer Vision (2009) 2225-2231.

Fang, C. et al., Automatic Image Cropping Using Visual Composition, Boundary Simplicity and Content Preservation Models, MM'14 (Nov. 2014) 4 pages.

Fenzi, M. et al., Class Generative Models Based on Feature Regression for Pose Estimation of Object Categories, CVPR2013 Paper (2013) 755-762.

Gaddam, V. R. et al., Automatic Real-Time Zooming and Panning on Salient Objects From a Panoramic Video, MM'14 (Nov. 2014) 725-726.

Gehler, P. et al., On Feature Combination for Multiclass Object Classification, IEEE (2009), 8 pages.

Geonaute Mountable Action Camera Records 360-degree Video [online] [retrieved Oct. 20, 2015]. Retrieved from the Internet: <URL: http://www.gizmag.com/geonaute-action-camera-360-degree-ces/25747/>. 7 pages.

International Search Report and Written Opinion for International Application No. PCT/IB2016/057951 dated Apr. 5, 2017.

Jayaraman, D. et al., Decorrelating Semantic Fisual Attributes by Resisting the Urge to Share, in Proc. of CVPR'14 (2014) 8 pages.

Ke, Xiao, Guo, Wenzhong; "Multi-Scale Salient Region and Relevant Visual Keywords Based Model for Automatic Image Annotation"; Multimedia Tools and Applications, (2016) 75:12477-12498.

Liu, J. et al., Multi-view Clustering via Joint Nonnegative Matrix Factorization, Proc. of SDM 13 (2013) 252-260.

Lucid—World's First Consumer Camera for VR—LucidCam [online] [retrieved Mar. 8, 2016] Retrieved from the Internet: <URL: http://www.lucidcam.com>. 7 pages.

Notice of Allowance for U.S. Appl. No. 14/985,666 dated Mar. 22, 2017.

Office Action for U.S. Appl. No. 14/985,866 dated Dec. 2, 2016.

Shin, Y-D. et al., A Method for Identifying Photo Composition of the Panoramic Image, Proceedings of the International MultiConference of Engineers and Computer Scientists 2015 vol. 1, IMECS 2015 (Mar. 2015) 8 pages.

Torralba, A. et al., Sharing Visual Features for Multiclass and Multiview Object Detection, in Press, IEEE Transactions on Pattern Analysis and Machine Intelligence (2007) 1-16.

Yigitsoy, Mehmet; Navab, Nassir; "Structure Propagation for Image Registration"; IEEE Transactions on Medical Imaging; vol. 32, No. 9, Sep. 2013; pp. 1657-1670.

Yuan, X-T. et al., Visual Classification With Multitask Joint Sparse Representation, IEEE Transactions on Image Processing, vol. 21, No. 10 (Oct. 2012) 4349-4360.

Zha, Z-J. et al., Robust Multiview Feature Learning for RGB-D Image Understanding, ACM Transactions on Intelligent Systems and Technology, vol. 6, No. 2, Article 15 (Mar. 2015) pp. 15:1-15:19.

Zhang, Fan; Liu, Feng; "Parallax-Tolerant Image Stitching"; 2014 IEEE Conference on Computer Vision and Pattern Recognition; Jun. 23, 2014; IEEE; pp. 4321-4328.

International Search Report from International Application No. PCT/FI2017/050870, dated Feb. 6, 2018, 11 pages.

International Search Report and Written Opinion for International Application No. PCT/IB2016/057959 dated May 4, 2017, 14 pages.

Office Action for U.S. Appl. No. 14/985,838 dated Oct. 18, 2017, 14 pages.

Office Action for U.S. Appl. No. 14/985,838 dated Dec. 11, 2018.

Office Action for U.S. Appl. No. 14/985,838 dated May 22, 2019.

Office Action for U.S. Appl. No. 14/985,838, dated May 18, 2018, 12 pages.

* cited by examiner

METHOD AND APPARATUS FOR DETERMINING AND VARYING THE PANNING SPEED OF AN IMAGE BASED ON SALIENCY

TECHNOLOGICAL FIELD

An example embodiment of the present disclosure relates to displaying images and video and, more particularly, to causing a panning speed of a displayed image or video to vary based on saliency.

BACKGROUND

Panoramic images, 360° images, and other digital imagery, including video content, have a wide field of view and represent a large amount of information. While panoramic images are popular with viewers for a variety of purposes including virtual reality applications and other types of applications, the consumption of the large amount of content provided by a panoramic image can be challenging as it is often tedious for a viewer to examine the entire panoramic image. For example, in head-worn or other wearable virtual reality displays, it may be difficult and require more effort for a viewer to examine those portions of the panoramic image which lie behind the viewer. Substantial head movements or turning may be required for a viewer to view the desired portion of the image, which may be difficult, uncomfortable, or frustrating for the user.

The challenges associated with the consumption of the large amounts of information provided by a panoramic image are also present in instances in which an image is viewed on a device that has not been specifically designed for the display of a panoramic or 360° images, such as a smartphone, a television monitor, a computer monitor or the like. In this regard, devices that have not been specifically designed to facilitate the display of the large amounts of information provided by imagery having large fields of view do not generally permit the user to view the panoramic image in its entirety. The user, instead, provides a scrolling or swiping input to pan the displayed portion to view other areas of the image. In some examples, the viewer must provide lengthy and/or repeated inputs to view the desired area of the image which can be tedious or time consuming for the user.

BRIEF SUMMARY

A method, apparatus, and computer program product are therefore provided for varying panning speeds of images, including video imagery, based on saliency. An example embodiment provides a more efficient way of providing 360-degree images, panoramic images, and/or other wide view area images relative to other systems providing images in which the panning speed does not vary based on saliency. According to an example embodiment, users may efficiently move the field of view (e.g. portion of the image displayed by the device) to focus on interesting parts of the image.

In this regard, a display of a user interface may provide only a portion of an image at a particular time, and the user pans to view other portions of the image. According to an example embodiment, a panning speed may be determined based on the currently displayed area and its importance, or saliency relative to the importance or saliency of non-displayed portions. For example, as a user pans from one area to another, while the user pans over important areas of the image, the actual reflected panning may occur at the same rate as the user-indicated panning, but when the user pans over a less important area, the determined panning speed may be faster than that user-indicated panning speed. In this regard, a user can more efficiently view important areas of the image. The user may also be more likely to perceive salient areas of the image.

In some head-worn or wearable displays or other virtual reality devices, the field of view, or displayed portion of the image, is repositioned based on the user's head rotation. If the user would like to view an image portion located behind the user, the user would need to turn their head around until they see the desired area of the image. According to an example embodiment, however, the user can view portions of the image behind the user, without necessarily making a commensurate turn or head movement. The user may instead perform a shorter or subtler head movement, to more efficiently pan to the desired area of the image.

A method, apparatus, and computer program product are therefore provided for varying panning speeds of images based on saliency.

The method includes receiving a panning indication comprising a panning direction relative to an image, wherein at least a displayed portion of the image is provided on a display. The method further includes identifying one or more salient portions of the image relative to the displayed portion and the panning direction. The method provides for causing the image to be panned on the display in response to the panning indication at a panning speed that varies depending upon a position of the one or more salient portions relative to the displayed portion.

A computer program product is also provided. The computer program product comprises at least one non-transitory computer-readable storage medium having computer-executable program code instructions stored therein. The computer-executable program code instructions comprise program code instructions to receive a panning indication comprising a panning direction relative to an image, wherein at least a displayed portion of the image is provided on a display. The computer-executable program code instructions further comprise program code instructions to identify one or more salient portions of the image relative to the displayed portion and the panning direction. The computer-executable program code instructions further comprise program code instructions to cause the image to be panned on the display in response to the panning indication at a panning speed that varies depending upon a position of the one or more salient portions relative to the displayed portion.

An apparatus is also provided. The apparatus comprises at least one processor and at least one memory including computer program code. The at least one memory and the computer program code are configured to, with the processor, cause the apparatus to receive a panning indication comprising a panning direction relative to an image, wherein at least a displayed portion of the image is provided on a display. The at least one memory and the computer program code are further configured to identify one or more salient portions of the image relative to the displayed portion and the panning direction. The at least one memory and the computer program code are further configured to cause the image to be panned on the display in response to the panning indication at a panning speed that varies depending upon a position of the one or more salient portions relative to the displayed portion.

An apparatus is also provided, with means for receiving a panning indication comprising a panning direction relative to an image, wherein at least a displayed portion of the image is provided on a display. The apparatus also includes means for identifying one or more salient portions of the image relative to the displayed portion and the panning direction. The apparatus further includes means for causing the image to be panned on the display in response to the panning indication at a panning speed that varies depending upon a position of the one or more salient portions relative to the displayed portion.

The image may be a video image and the panning speed may vary further based on a temporal characteristic of the one or more salient portions of the image. In certain embodiments, the panning speed varies further based on audio data relating to the one or more salient portions of the image.

The panning speed may be slower in an instance the displayed portion comprises at least one of the one or more salient portions, relative to the panning speed in an instance the displayed portion comprises no salient portions. In some embodiments, the panning speed is faster in an instance the panning direction is toward at least one of the one or more salient portions and the salient portion is not displayed, relative to the panning speed in an instance the one or more salient portions is displayed. In some embodiments, the panning speed is calculated as a predetermined multiplier times a user-indicated panning speed.

The panning indication may be received in response to movement of a wearable device, a scrolling input, and/or a touch input.

BRIEF DESCRIPTION OF THE DRAWINGS

Figure 1:
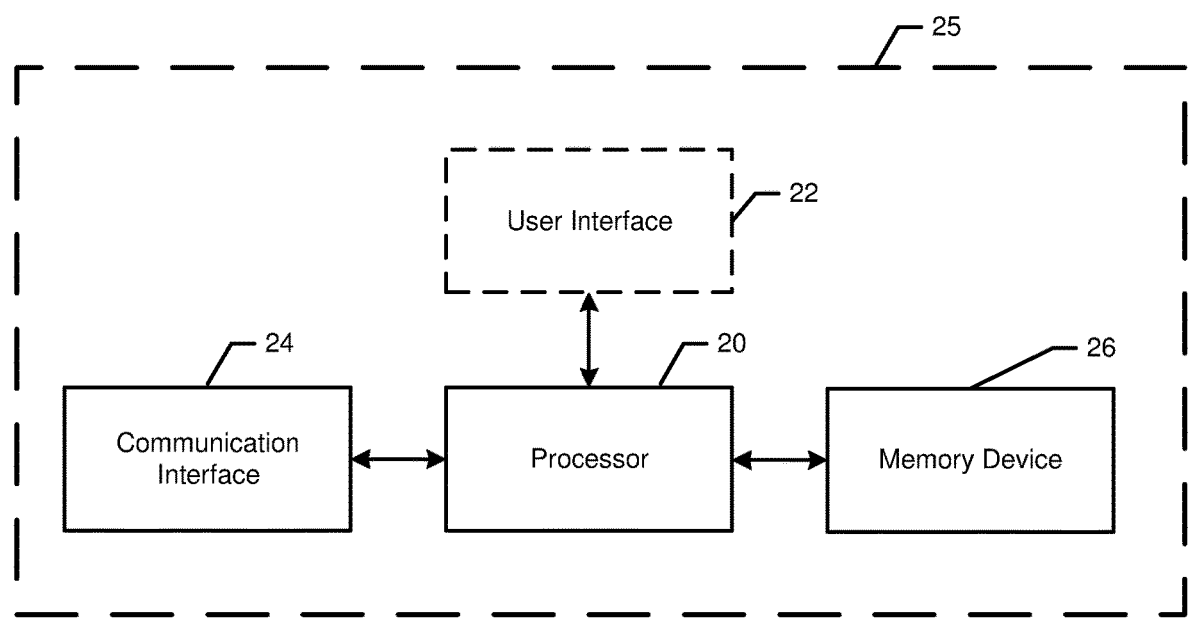
Figure 2:
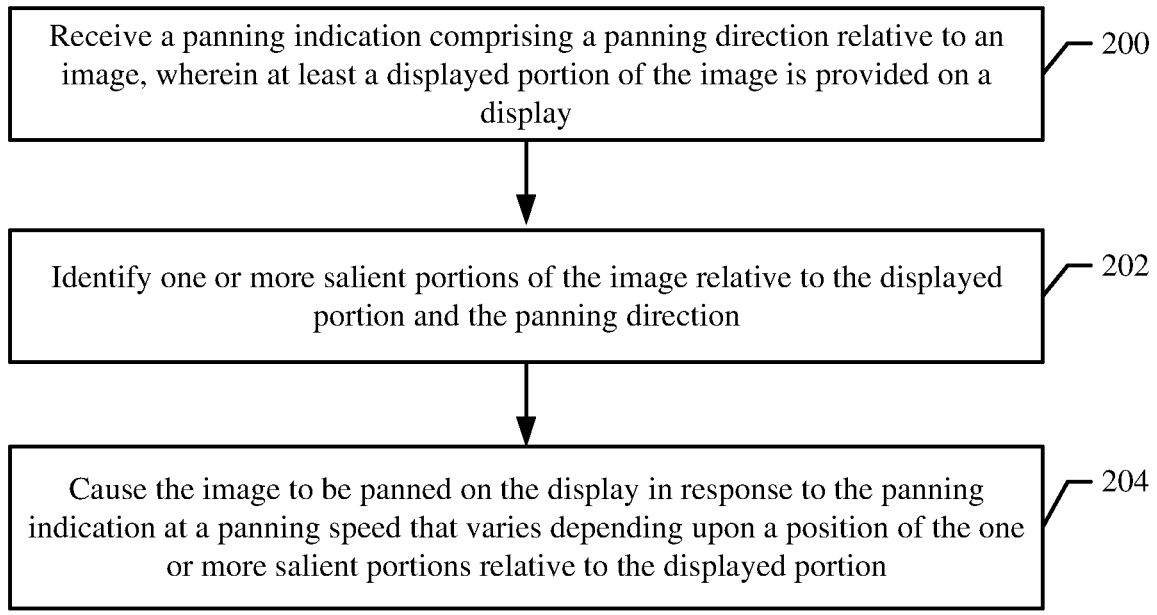
Figure 3:
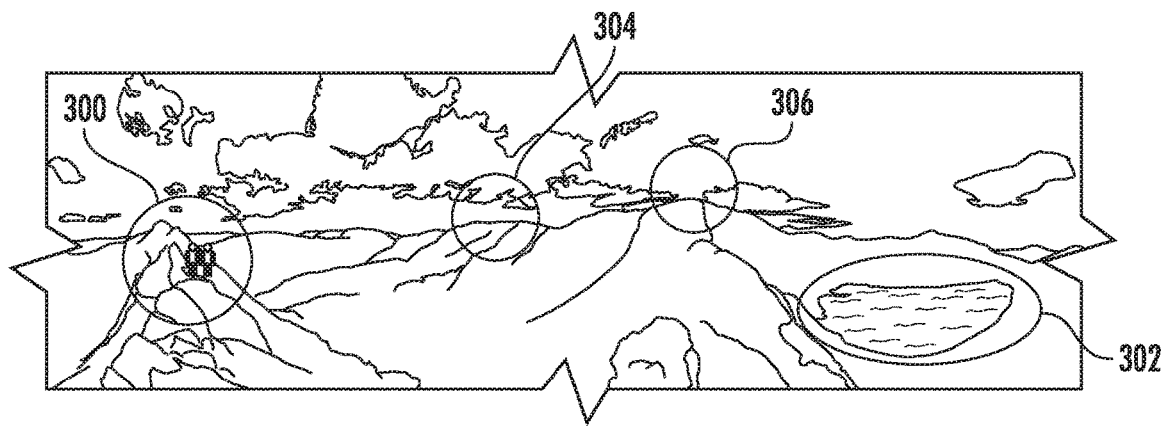

Having thus described certain example embodiments of the present invention in general terms, reference will hereinafter be made to the accompanying drawings which are not necessarily drawn to scale, and wherein:

FIG. 1 is a block diagram of an apparatus that may be configured to implement an example embodiment of the present disclosure;

FIG. 2 is a flowchart of operations that may be performed in accordance with an example embodiment of the present disclosure;

FIG. 3 is an example image according to an example embodiment; and

Figure 4:
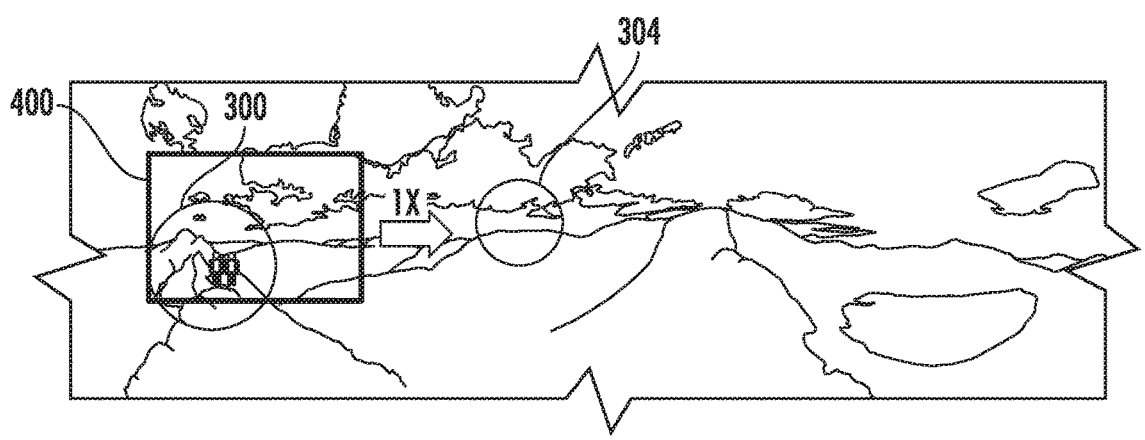
Figure 5:
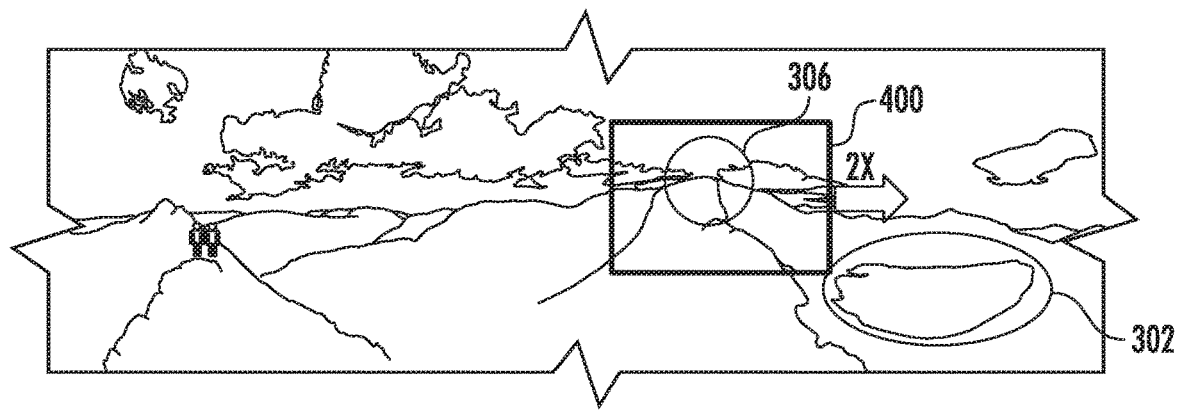
Figure 6:
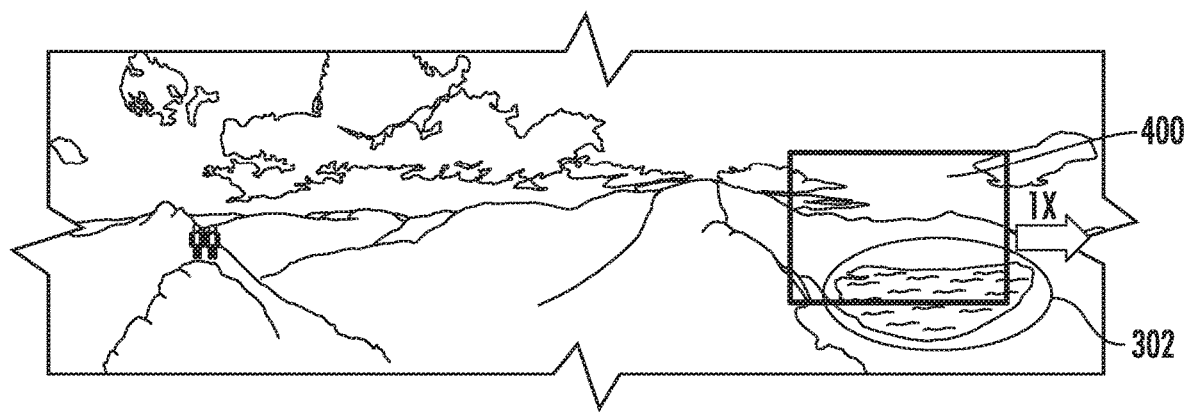

FIGS. 4-6 illustrate displayed portions of the image of FIG. 3 at various instances in time according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As described below, a method, apparatus and computer program product are provided for varying panning speeds of images based on saliency, and improves the efficiency of image and video display. In this regard, any reference to an image or images made herein is non-limiting and may further include video imagery and/or any other digital content. For example, an image may include a movie, or a scene such as a remotely captured live scene or other digital content.

Referring to FIG. 1, apparatus 25 may include or otherwise be in communication with processor 20, user interface 22, communication interface 24, and memory device 26. The user interface 22 may be considered optional in apparatus 25, as indicated by the dashed line.

In some examples, apparatus 25 may be implemented as a server or distributed system for causing a panning speed of an image to vary based on saliency. In some examples, apparatus 25 may include a wide variety of devices including personal computers, work stations, or mobile terminals, such as laptop computers, tablet computers, smartphones, wearable devices (e.g., head-worn devices), or any combination of the aforementioned, and other types of voice and text communications systems. In some examples, apparatus 25 may be embodied by a user device comprising the display on which the image is provided to a user. Additionally or alternatively, apparatus 25 may be embodied by a server for processing user inputs and/or determining panning speeds, which in turn, may be reflected on a user interface display of another device.

In some embodiments, the processor 20 (and/or co-processors or any other processing circuitry assisting or otherwise associated with the processor 20) may be in communication with the memory device 26 via a bus for passing information among components of the apparatus 25. The memory device 26 may include, for example, one or more volatile and/or non-volatile memories. In other words, for example, the memory device 26 may be an electronic storage device (e.g., a computer readable storage medium) comprising gates configured to store data (e.g., bits) that may be retrievable by a machine (e.g., a computing device like the processor 20). The memory device 26 may be configured to store information, data, content, applications, instructions, or the like for enabling the apparatus to carry out various functions in accordance with an example embodiment of the present invention. For example, the memory device 26 could be configured to buffer input data for processing by the processor 20. Additionally or alternatively, the memory device 26 could be configured to store instructions for execution by the processor 20.

In some embodiments, the apparatus 25 may be embodied as a chip or chip set. In other words, the apparatus 25 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 25 may therefore, in some cases, be configured to implement an embodiment of the present invention on a single chip or as a single "system on a chip." As such, in some cases, a chip or chipset may constitute means for performing one or more operations for providing the functionalities described herein.

The processor 20 may be embodied in a number of different ways. For example, the processor 20 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 20 may include one or more processing cores configured to perform independently. A multi-core processor may enable multiprocessing within a single physical package. Additionally or alternatively, the processor 20 may include one or more processors configured in tandem via the bus to enable independent execution of instructions, pipelining and/or multithreading.

In an example embodiment, the processor 20 may be configured to execute instructions stored in the memory device 26 or otherwise accessible to the processor 20. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to an embodiment of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software instructions, the instructions may specifically configure the processor 20 to perform the algorithms and/or operations described herein when the instructions are executed. However, in some cases, the processor 20 may be a processor of a specific device (e.g., a mobile terminal or network entity) configured to employ an embodiment of the present invention by further configuration of the processor 20 by instructions for performing the algorithms and/or operations described herein. The processor 20 may include, among other things, a clock, an arithmetic logic unit (ALU) and logic gates configured to support operation of the processor 20.

Meanwhile, the communication interface 24 may be any means such as a device or circuitry embodied in either hardware or a combination of hardware and software that is configured to receive and/or transmit data from/to a network and/or any other device or module in communication with the apparatus 25. In this regard, the communication interface 24 may include, for example, an antenna (or multiple antennas) and supporting hardware and/or software for enabling communications with a wireless communication network. Additionally or alternatively, the communication interface 24 may include the circuitry for interacting with the antenna(s) to cause transmission of signals via the antenna(s) or to handle receipt of signals received via the antenna(s). In some environments, the communication interface 24 may alternatively or also support wired communication. As such, for example, the communication interface 24 may include a communication modem and/or other hardware/software for supporting communication via cable, digital subscriber line (DSL), universal serial bus (USB) or other mechanisms. The communication interface 24 may be configured to facilitate communication between apparatus 25 and a user device, such as by enabling processor 20 to direct the panning speed of an image provided via a user interface (e.g., user interface 22).

In some embodiments, such as instances in which the apparatus 25 is embodied by a user device, the apparatus 25 may include a user interface 22 that may, in turn, be in communication with the processor 20 to receive an indication of a user input. For example, a user input provided via user interface 22 may correspond to a panning indication received by apparatus 25. The panning indication may include a user-indicated panning speed and panning direction. The user interface 22 may include a keyboard, mouse, joystick, touch screen, touch areas, scroller ball, soft keys, a microphone, ringer, speaker, or other input mechanisms. In some examples, the user interface 22 may include or be communicatively connected to any number of sensors, such as an accelerometer configured to detect movement of a wearable device, handheld device, or other device, such that the user may provide inputs based on such movements. For example, a user may turn their head while wearing a head-worn device comprising a display, in order to provide a user input for panning to view other areas of a displayed image. The user interface 22 may therefore include any input mechanisms configured for receiving user input or other information comprising a user-indicated panning speed and panning direction.

The user interface 22 may be further configured to cause provision of any audible, visual, mechanical or other output to the user. As such, the user interface 22 may include a display, such as one configured for displaying an image or video. Example displays which may be included in user interface 22 may include a computer monitor, tablet screen, television monitor, head-worn display, other wearable display, a display or plurality of displays providing a virtual reality environment, and/or the like. The user interface 22 may therefore be configured to reflect panning speeds varied based on salient portions of the displayed image. In some examples, user interface 22 may include additional output mechanisms.

In some examples, the processor 20 may comprise user interface circuitry configured to control at least some functions of one or more of the aforementioned user interface elements. The processor 20 and/or user interface circuitry comprising the processor 20 may be configured to control one or more functions of one or more user interface elements through computer program instructions (e.g., software and/or firmware) stored on a memory accessible to the processor 20 (e.g., memory device 26, and/or the like). In some examples, user interface 22 may be embodied by a user device that is remote from or external to apparatus 25.

FIG. 2 is a flowchart of operations performed by apparatus 25 according to an example embodiment. As shown by operation 200, apparatus 25 may include means, such as the processor 20, user interface 22, communication interface 24, memory device 26, or the like, for receiving a panning indication comprising a panning direction relative to an image, wherein at least a displayed portion of the image is provided on a display.

The displayed portion of the image may be considered a portion of the image on which the display is focused on at a particular instance in time. In this regard, the portion of the image on which the display is focused at the time of, or substantially at the time that a user input indicative of the panning indication is provided, may be referred to herein as a displayed portion. The term "substantially" is used in the aforementioned description of the displayed portion because updates to the display (such as based on panning) may occur in rapid succession in response to user inputs such that any delay in response time (such as processing time incurred by processor 20) may be insignificant to the user. That is, the user pans the image so that other portions of the image are revealed, and the user experiences real-time or near real-time response times. For example, in virtual reality implementations, a user turns to view other portions of an image and the display updates such that the user feels immersed in the image. In this regard, the displayed portion is described as the area the user views at the time of providing the input, although small differences, such as milliseconds may actually occur between the time of the provision of the user input and/or receipt of the panning indication and the time the corresponding displayed portion is determined or identified. Accordingly, any reference herein made to a displayed portion at a "particular instance in time" a user input is provided and/or corresponding panning indication is received, will be appreciated to include the displayed portion at substantially the same time the user input is provided and/or corresponding panning indication is received.

In some examples, the displayed portion may include the entirety of the image portion that is displayed at the particular instance in time the user input is provided and/or corresponding panning indication is received. In some examples, such as those in which head-worn or other virtual reality displays are utilized, the displayed portion may include a focused portion of the displayed portion of the image displayed in front of the user, whereas other portions outside the displayed portion may be in a peripheral location such that those portions are blurry, out of focus, or not perceivable by the user.

In this regard, some areas of the image may be considered non-displayed portions as those portions are not in view or are not perceivable by the user in the particular instance in time in which the displayed portion is perceivable.

The panning indication is representative of, or corresponds to, a user input provided via a user interface as described in further detail below. In some embodiments, such as those in which the display by which the image is provided and/or the user interface by which the user input is received are external to apparatus 25, the panning indication may be received by apparatus 25 via the communication interface 24. In some examples, the panning indication may be provided by user interface 22 and/or accessed on memory device 26.

According to an example embodiment, while a user views an image provided on a display, such as that provided by user interface 22, the user provides an input that is indicative of a panning direction relative to the displayed portion. In some examples, the panning indication includes a user-indicated panning speed indicated by a speed of the user input. For example, the user may move a mouse at a user-indicated panning speed or swipe (e.g., touch, and drag) on a touch screen at a user-indicated panning speed to initiate movement of the image or refocusing of the image in another area (e.g., movement or repositioning of the displayed portion). The user may select and hold arrows that are aimed in different directions, such that the amount of time an arrow is selected is indicative of a user-indicated panning speed. The user-indicated panning speed may therefore be determined as or represented by a number of pixels per second (e.g., the number of pixels per second over which a swiping gesture is performed), or as determined by a mouse input, scrolling input, or any other type of user input.

In some examples, the user input corresponding to a panning indication may include movement of the user's head and/or detected movement of a head-worn or other wearable device. The user-indicated panning speed may therefore be determined based on the head, user, and/or device movement. For example, the user-indicated panning speed may be calculated as a proportion of the speed of the user, head, or device movement relative to the displayed pixels of the image. In some examples, the user-indicated panning speed may be calculated as a degrees per second based on an angle of movement. As another example, the user-indicated panning may be determined by the angle or measured degrees a user's head is turned in the relation to the torso of the user or the rest of the body of the user. In such an example, the user may further indicate to stop the panning, by returning the user's head position to forward facing.

Regardless of the type of user interface and/or user device by which the user input is provided, the user input is further indicative of a panning direction, to indicate in which direction relative to the displayed portion the image should be panned. In examples in which the user input is provided via a swiping gesture on a touch screen display, the user may touch the display, and swipe to the right, in order to indicate a panning direction to the left (e.g., to view a peripheral area or non-displayed portion of the image that is further left to a displayed portion of the image). In examples in which a mouse is used for user input, the user may optionally depress a mouse button and move the mouse to the right, in order to indicate a panning direction to the left. In this regard, the panning direction may be opposite from or substantially opposite from a direction of a user input. However, in some examples, such as those in which the user wears a head-worn device or other wearable device, the user and/or user's head may turn to the right to indicate a panning direction to the right. Therefore, the panning direction may be in the same direction or substantially same direction as the user input.

Panning directions of left, right, up, and down, may be used herein as non-limiting examples. However, it will be appreciated that a panning direction may include any data indicative of a direction of movement relative to a displayed portion of an image and/or the entirety of the image, so as to cause panning of the image in the panning direction. For example, the panning direction may include an angle, curvature and/or trajectory relative to an axis in a predefined position relative to the image. In some examples, the panning direction may include an angle, curvature and/or trajectory relative to an origin of the user input relative to the displayed portion of the image. In some examples, the panning direction may be received by apparatus 25 and/or calculated by processor 20 as data indicative of positions and/or movement relative to the display. The apparatus 25, such as processor 20, may process the data so that the panning direction is determined relative to the displayed portion.

As shown by operation 202, apparatus 25 may include means, such as the processor 20, communication interface 24, memory device 26, or the like, for identifying one or more salient portions of the image relative to the displayed portion and the panning direction.

In some examples, apparatus 25 may include means, such as processor 20, for determining salient areas or portions of the image. As another example, saliencies of various portions of the image may be determined prior to operation 202. The saliencies may be provided to apparatus 25 by another device, such as via communication interface 24, and/or accessed on memory device 26. Salient portions of the image may be identified in the displayed portion, or in a non-displayed portion.

A saliency of an image area may be identified based on objects of interest detected in the images. Areas of the image more likely to be of interest to the user have higher saliency values and areas less likely to be of interest to the user have lower saliency values, or may be referred to as image portions comprising no salient portions. Areas having higher saliency values may include objects that stand out from the rest of the image. For example, salient portions, or image portions having higher saliency values could have different colors or other features relative to non-salient image portions, or portions having lower saliency values.

In some examples, the saliency of various areas of the image may be scored and/or ranked based upon predefined criteria such as an aesthetic value. An area of an image having a higher aesthetic value would be considered more aesthetically pleasing while image areas having a lower aesthetic value would be considered less aesthetically pleasing. In some examples, the apparatus 25, such as the processor 20, may utilize a computational aesthetics scoring algorithm, such as described by Luca Marchesotti, et al., *Assessing the aesthetic quality of photographs using generic image descriptors*, International Conference on Computer Vision (ICCV '11), Washington, D.C., USA, pp. 1784-1791 (2011), in order to score various areas of the image.

In some examples, the saliency of different areas may be determined with attention-based image saliency techniques. In some examples, the saliency may be based on detected movements or motions, such as in video imagery. For example, areas associated with movements between frames and/or more significant movements or larger scene movement or object variation than that of other portions may have a higher saliency relative to the areas with less movement or less object variation. A temporal characteristic or indicator, such as a timestamp of the video imagery may be associated with a saliency value.

Audio data may also be considered in determining saliency. For example, areas of an image having areas with associated louder audio, such as a concert stage, may be more salient in comparison to areas of an image with lower audio data or volume.

As another example, areas of an image identified as frequently viewed and/or focused upon by the same and/or other users may have a higher saliency than that of areas viewed less frequently.

In some examples, a saliency map of an image may be generated and/or accessed to determine respective saliencies of various areas of the image. A saliency map of an image may be generated in various manners including, for example, the technique described by Stas Goferman, et al., *Context-Aware Saliency Detection*, IEEE Trans. Pattern Anal. Mach. Intell. 34, 10 (October 2012), pp. 1915-1926. In an example embodiment, the saliency map may associate a value with each pixel or group of pixels that is representative of a measure of saliency of the pixel or group of pixels. The saliency map may create a visual representation of the saliency of the pixels or groups of pixels with the pixel value representative of a measure of saliency of the respective pixel or group of pixels. For example, a visual representation of a saliency map may identify the most salient pixels with a white color, the least salient pixels with a black color and pixels of intermediate levels of saliency with gray colors ranging from black representative of less salient to white representative of more salient. The corresponding saliencies may be inferred or retrieved from the saliency map by apparatus 25, such as with processor 20.

The aforementioned criteria and methods for determining saliency in an image are provided as examples, and it will be appreciated that any criteria or method may be used as determining saliency of various areas of an image.

As shown by operation 204, apparatus 25 may include means, such as the processor 20, user interface 22, communication interface 24, memory device 26, or the like, for causing the image to be panned on the display in response to the panning indication at a panning speed that varies depending upon a position of the one or more salient portions relative to the displayed portion. In some examples, the panning speed may vary further depending upon the panning direction.

Because the panning speed may vary based upon a position of a salient portion of the image, the panning speed may be considered a saliency-based panning speed. For example, the saliency-based panning speed may be selected from one of a predetermined high panning speed and predetermined low panning speed, based on a saliency of a displayed portion and/or non-displayed portion of the image. Utilizing high and low predetermined panning speeds is provided merely as an example, and it will be appreciated that any number of predetermined panning speeds may be determined by apparatus 25.

Additionally or alternatively, the saliency-based panning speed may be calculated based on the user-indicated panning speed, such as adjusting the user-indicated panning speed based on a saliency of a displayed portion and/or non-displayed portion of the image. For example, determining the saliency-based panning speed may include calculating the saliency-based panning speed as a predetermined multiplier times the user-indicated panning speed. For example, the saliency-based panning speed may be calculated as two times the user-indicated panning speed for the high panning speed and one times the user-indicated panning speed for the low panning speed. Any multiplier or factor may be used in such a calculation.

In some examples, based on the respective saliencies of different areas of the image, and the panning indication including the user-indicated panning speed and panning direction, the saliency-based panning speed may be determined accordingly. The saliency-based panning speed may be determined as pixels per second or any other measurement for controlling and/or changing a portion of an image provided by a display over time.

In some embodiments, apparatus 25, such as with processor 20, determines the panning speed such that the panning speed is slower in an instance the displayed portion comprises at least one of the one or more salient portions, relative to the panning speed in an instance the displayed portion comprises no salient portions. As such, a user may be more likely to view and to perceive the salient portions as slower panning is performed, and can more efficiently pan to salient portions of an image.

In some embodiments, apparatus 25, such as with processor 20, determines the panning speed such that the panning speed is faster in an instance the panning direction is toward at least one of the one or more salient portions and a salient portion is not currently displayed, relative to the panning speed in an instance the one or more salient portions is displayed. In this regard, the apparatus 25 may encourage faster panning toward a salient portion that is not yet perceivable by the user.

As another example, in some embodiments, the panning speed is determined as a saliency-based panning speed based on the user-indicated panning speed. In an instance the saliency of the displayed portion of the image is determined to be higher relative to the saliency of the non-displayed portion, apparatus 25, such as with processor 20, may determine the saliency-based panning speed as slower than or equal to the user-indicated panning speed. In some embodiments, in an instance the saliency of the displayed portion of the image is determined to be lower relative to the saliency of the non-displayed portion, apparatus 25, such as with processor 20, may determine the saliency-based panning speed as faster than the user-indicated panning speed.

However, apparatus 25, such as with processor 20, may cap or limit the saliency-based panning speed. Apparatus 25, such as with processor 20, may therefore prevent the saliency-based panning speed from exceeding a predefined speed so as to limit user confusion and disorientation. For example, the saliency-based panning speed may be capped at a predefined number of pixels per second. In certain example embodiments, the saliency-based panning speed may be limited so that the panning speed is not less than (e.g., slower than) a predetermined value.

In some embodiments, the saliency-based panning speed may be determined according to baseline user-indicated panning speeds. For example, given baseline measurements of user-indicated panning speeds, such as when a user initially uses a device or provides a user input, the saliency-based panning speed may be calculated as equal to, proportional to, and/or commensurate with the user-indicated panning speed if the baseline user-indicated panning speeds are already relatively high (e.g., at least as large as a predefined threshold), even while the displayed portion includes uninteresting areas or areas having low saliency relative to a non-displayed portion.

However, in some embodiments, the panning may occur regardless of a user input and/or user-indicated panning speed. In this regard, apparatus 25 may cause provision of an image, and cause the image to be panned based on saliency in the image. In this regard, the panning indication may be generated by processor 20, such as in an automated fashion without input from the user. For example, the apparatus 25 may pan around an entire panoramic image with the panning speed faster through those portions without salient features and slower through those portions with salient features.

In certain example embodiments, if the displayed portion comprises more than one salient portion, the saliency-based panning speed may be different than the saliency-based panning speed in a situation in which there is only one salient area inside the displayed portion.

In some examples, the saliency-based panning speed may vary based on audio data relating to the one or more salient portions of the image. For example, the saliency-based panning speed may be relatively faster in areas having associated lower volume, whereas the saliency-based panning speed may be relatively slower in areas having associated higher volume.

Regardless of the method used to determine the panning speed, which may be considered a saliency-based panning speed, the apparatus 25 includes means, such as the processor 20, user interface 22, memory device 26, or the like, for causing the image to be panned at the panning speed that varies depending upon the position of a salient portion of the image.

An improved user experience and improved efficiencies may therefore be provided. For example, in the case of head-worn displays or other wearable virtual reality devices, while the user turns their head, the scene movement is accelerated while viewing uninteresting, low-saliency, or non-salient parts of the image, whereas the movement may be realistic, proportional and/or linear to (or slower than) that of the user-indicated panning speed while viewing the important or salient areas of the image. Thus, the user need not turn their head as far to see the more salient parts of the image and/or the panning movement may be completed more quickly as a result of the increased panning speed through the portions of lower saliency.

In examples in which the user input is a scrolling input or swiping input, the panning may be faster when viewing uninteresting parts of the image, while the scrolling speed is realistic and/or linear to that of the user-indicated panning speed while viewing the salient portions.

An example embodiment may cause panning speeds to vary based on saliency in video imagery, such as by considering not only the salient portions in the current image, but also the salient portions in subsequent (temporally) images. The panning speed may be varied, for example, when a critical or salient event is just about to happen in the current field of view (e.g., the displayed portion) during a subsequent frame. An example embodiment can provide for decelerating the rotation of the view if the user is about to turn away from a salient portion of a subsequent video image that should be consumed. In this regard, the panning speed may further vary based on a temporal characteristic of a salient portion of the video image. Said differently, the salient portion may occur at a specific time in the video image, such that the panning speed varies based on the temporal characteristic of the salient portion as well as the location of the salient portion in the subsequent frame relative to the current field of view. By way of example, in an instance in which a subsequent frame will introduce a salient portion within the current field of view, the panning speed may be decreased to increase the likelihood that the user sees the salient portion in the subsequent frame. Conversely, in an instance in which the current field of view does not include salient portions in the subsequent frames, the panning speed may be correspondingly increased.

FIGS. 3-6 illustrate example images that may be processed by apparatus 25. FIG. 3 is a panoramic image which is made accessible by apparatus 25 via a display, such as user interface 22. The image includes areas 300 and 302 as relatively high-saliency areas relative to other areas of the image, such as areas 304 and 306 having relatively lower saliency. Area 300 includes people on a mountain side, and area 302 includes an aesthetically pleasing lake. As another example, areas 300 and 302 may be considered salient, whereas areas 304 and 306 may be considered non-salient. In some examples, only a portion of the image may be viewable by a user at a given time. The areas illustrated in FIG. 3 described as having different saliencies are referred to hereinafter in the descriptions of FIGS. 4-6.

FIGS. 4-6 indicate the portion of the image corresponding to the displayed portion 400 that is provided via the display at respective instances in time, although the entire image is provided in FIGS. 4-6 to provide the full context of the image. The areas outside of the displayed portion 400 may not be viewable or perceivable by the user at the particular instance in time a user input is provided that results in a panning indication described with respect to FIGS. 4-6. FIGS. 4-6 reflect the positioning of the displayed portion 400 at different instances in time as the user pans to the right. For example, FIG. 4 reflects the positioning of the displayed portion 400 at a particular instance in time t. FIG. 5 reflects the positioning of the displayed portion 400 at a particular instance in time $t_+1$ second, for example. FIG. 6 may reflect the positioning of the displayed portion 400 at a particular instance in time $t_+2$ seconds, for example.

As illustrated in FIG. 4, the user provides an input indicative of panning to the right (e.g., such as by touching a touch screen and swiping to the left). In response to the associated panning indication, apparatus 25 may cause the saliency-based panning speed to be equal to, or 1× the user-indicated panning speed, because the displayed portion 400 is determined to have a higher saliency relative to the saliency of area 304, a non-displayed portion positioned in the panning direction relative to area 300 (e.g., to the right of area 300, where area 300 is associated with the displayed portion 400). Similarly, in an instance the user wears a head-worn device and the displayed portion 400 is positioned as indicated in FIG. 4, in response to the user rotating their head to the right, the field of view may be moved at the same speed of the head's movement based on the higher saliency of area 300 relative to area 304. As another example, the saliency-based panning speed may be slower than the user-indicated panning speed, such as half or another pre-defined fraction of the user-indicated panning speed.

As illustrated in FIG. 5, as the displayed portion is updated to reflect the displayed portion of the image as the user pans the image, the saliency-based panning speed may change. In FIG. 5, the displayed portion 400 is updated so as to correspond to area 306 of the image. As the user continues to pan to the right, the saliency-based panning speed is increased to 2× or two-times the user-indicated panning speed because the displayed portion is associated with a lesser salient area than that of area 302 including the lake. In this regard, the display will more quickly pan over the uninteresting area 306 so that the user may more efficiently access or view area 302. Similarly, in an instance the user wears a head-worn device and the displayed portion 400 is positioned as indicated in FIG. 5, in response to the user rotating their head to the right, towards the lake, apparatus 25, such as with processor 20, may cause the display to pan faster than the user movement, as the mountains of area 306 are considered less interesting than the lake of area 302.

As indicated in FIG. 6, as the user continues panning to the right, and the displayed portion 400 is updated to reflect the displayed portion of the image which corresponds to area 302, apparatus 25, such as with processor 20, causes the saliency-based panning speed to change to 1× the user-indicated panning speed, because the displayed portion 400 includes an area 302 having high-saliency.

In this regard, certain example embodiments cause panning speeds to vary based on saliency in an image. An example embodiment may calculate saliency-based panning speeds and may provide for improved efficiency in displaying the image to the user. As such, the method, apparatus and computer program product provide numerous technical advantages including the conservation of processing resources and the associated power consumption otherwise expended to support the display of images without varying the panning speed based on saliency. For example, more processing resources and higher power consumption may occur while a display provides non-salient portions of an image or portions having low saliency for a longer period of time, whereas increasing the panning speed over non-salient portions may conserve processing resources and power consumption by completing the panning operation more quickly.

Certain example embodiments may further ensure the user perceives the salient portions of the image. An example embodiment provide a non-intrusive indication to the user regarding salient portions and non-salient portions of an image. In some instances, a viewer may be unaware that the panning speed varies based on saliency, but an example embodiment may result in a viewer subconsciously focusing on salient portions of the image. Certain example embodiments therefore provide for the display to include the higher saliency or important areas of an image without the user needing to know which part of the image is relevant. Consequently, a user may spend less time and consume fewer processing resources hunting for the portions of higher saliency within an image.

An example embodiment further provides that accelerating the panning speed in low saliency portions of an image gives intuitive user feedback of the content. Decelerating the panning speed may occur if the user is already viewing the salient portions, or that something more important is to occur in the near future in the displayed portion of a video image (e.g., in subsequent frames).

Certain example embodiments provide the aforementioned advantages without needing to embed graphics and/or other elements to indicate the important parts of the image and therefore enable full immersion and access to the displayed image. In some embodiments, the features described herein with regard to varying a panning speed based on saliency could be selectively disabled or turned off.

As described above, FIG. 2 illustrates a flowchart of an apparatus 25, method, and computer program product according to an example embodiment of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of an apparatus 25 employing an embodiment of the present invention and executed by a processor 20 of the apparatus 25. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to at least:
   receive a user input comprising at least a user-provided panning input comprising a user-provided panning speed directing a speed at which a field of view, displaying a subset of an image area, moves relative to the image area, and a panning direction directing a direction in which the field of view moves relative to the image area;
   identify a position of one or more salient portions of the image area relative to the field of view and the panning direction;
   determine a multiplier dependent on the position of the one or more salient portions of the image area relative to the field of view and the panning direction;
   calculate a variable panning speed by which to move the field of view relative to the image area by multiplying the user-provided panning speed by the multiplier, wherein the multiplier results in a variable panning speed that is faster than the user-provided panning speed in an instance the one or more salient portions are outside of the field of view and the panning direction is in the direction toward the one or more salient portions, and the multiplier results in a variable panning speed that is slower or equal to the user-provided panning speed in an instance the one or more salient portions are inside the field of view and in a instance the one or more salient portions are outside the field of view but the panning direction is away from the one or more salient portions; and
   cause the field of view to move relative to the image area at the variable panning speed and in the panning direction.

2. The apparatus according to claim 1, wherein in the instance the one or more salient portions are outside of the field of view and the panning direction is in the direction toward the one or more salient portions, the multiplier is greater than one.

3. The apparatus according to claim 1, wherein the at least one memory and the computer program code configured to, with the processor, cause the apparatus to at least:
   determine in a non-salient instance that the field of view does not include the one or more salient portions; and
   determine in a subsequent instance to the first instance that the field of view includes the one or more salient portions, and in response thereto, decrease the multiplier used to calculate the variable panning speed in the subsequent instance in comparison to the multiplier used to calculate the variable panning speed in the non-salient instance.

4. The apparatus according to claim 1, wherein the image area has associated audio data and variable volumes associated with respective portions of the image area, wherein the modified panning speed varies in comparison to the user-provided panning speed based on a volume associated with the subset of the image area displayed in the field of view.

5. The apparatus according to claim 1, wherein the user input comprises at least a movement of a head, wherein the field of view is caused to move, at least for a duration of time, at a variable panning speed that is faster than the user-indicated panning speed such that the head need not turn as far to cause the one or more salient portions to be displayed in the field of view in comparison to if the variable panning speed was not used and the field of view only moved as directed by the user-indicated panning speed.

6. The apparatus according to claim 1, wherein the user input comprises a swiping input, wherein the field of view is caused to move, at least for a duration of time, at a variable panning speed that is faster than the user-indicated panning speed such that at least one of a length of the swiping input or a number of repetitions of the swiping input is reduced in comparison to if the variable panning speed was not used and the field of view only moved as directed by the user-indicated panning speed.

7. A method comprising:
   receiving a user input comprising at least a user-provided panning input comprising a user-provided panning speed directing a speed at which a field of view, displaying a subset of an image area, moves relative to the image area, and a panning direction directing a direction in which the field of view moves relative to the image area;
   identifying a position of one or more salient portions of the image area relative to the field of view and the panning direction;

determining a multiplier dependent on the position of the one or more salient portions of the image area relative to the field of view and the panning direction;

calculating a variable panning speed by which to move the field of view relative to the image area by multiplying the user-provided panning speed by the multiplier, wherein the multiplier results in a variable panning speed that is faster than the user-provided panning speed in an instance the one or more salient portions are outside of the field of view and the panning direction is in the direction toward the one or more salient portions, and the multiplier results in a variable panning speed that is slower or equal to the user-provided panning speed in an instance the one or more salient portions are inside the field of view and in a instance the one or more salient portions are outside the field of view but the panning direction is away from the one or more salient portions; and causing the field of view to move relative to the image area at the variable panning speed and in the panning direction.

8. The method according to claim 7, wherein in the instance the one or more salient portions are outside of the field of view and the panning direction is in the direction toward the one or more salient portions, the multiplier is greater than one.

9. The method according to claim 7, further comprising: determining in a non-salient instance that the field of view does not include the one or more salient portions; and determining in a subsequent instance to the first instance that the field of view includes the one or more salient portions, and in response thereto, decreasing the multiplier used to calculate the variable panning speed in the subsequent instance in comparison to the multiplier used to calculate the variable panning speed in the non-salient instance.

10. The method according to claim 7, wherein the image area has associated audio data and variable volumes associated with respective portions of the image area, wherein the modified panning speed varies in comparison to the user-provided panning speed based on a volume associated with the subset of the image area displayed in the field of view.

11. The method according to claim 7, wherein the user input comprises at least a movement of a head, wherein the field of view is caused to move, at least for a duration of time, at a variable panning speed that is faster than the user-indicated panning speed such that the head need not turn as far to cause the one or more salient portions to be displayed in the field of view in comparison to if the variable panning speed was not used and the field of view only moved as directed by the user-indicated panning speed.

12. The method according to claim 7, wherein the user input comprises a swiping input, wherein the field of view is caused to move, at least for a duration of time, at a variable panning speed that is faster than the user-indicated panning speed such that at least one of a length of the swiping input or a number of repetitions of the swiping input is reduced in comparison to if the variable panning speed was not used and the field of view only moved as directed by the user-indicated panning speed.

13. A computer program product comprising at least one non-transitory computer-readable storage medium having computer-executable program code instructions stored therein, the computer-executable program code instructions comprising program code instructions to:

receive a user input comprising at least a user-provided panning input comprising a user-provided panning speed directing a speed at which a field of view, displaying a subset of an image area, moves relative to the image area, and a panning direction directing a direction in which the field of view moves relative to the image area;

identify a position of one or more salient portions of the image area relative to the field of view and the panning direction;

determine a multiplier dependent on the position of the one or more salient portions of the image area relative to the field of view and the panning direction;

calculate a variable panning speed by which to move the field of view relative to the image area by multiplying the user-provided panning speed by the multiplier, wherein the multiplier results in a variable panning speed that is faster than the user-provided panning speed in an instance the one or more salient portions are outside of the field of view and the panning direction is in the direction toward the one or more salient portions, and the multiplier results in a variable panning speed that is slower or equal to the user-provided panning speed in an instance the one or more salient portions are inside the field of view and in a instance the one or more salient portions are outside the field of view but the panning direction is away from the one or more salient portions; and cause the field of view to move relative to the image area at the variable panning speed and in the panning direction.

14. The computer program product according to claim 13, wherein in the instance the one or more salient portions are outside of the field of view and the panning direction is in the direction toward the one or more salient portions, the multiplier is greater than one.

15. The computer program product according to claim 13, wherein the computer-executable program code instructions further comprise program code instructions to:

determine in a non-salient instance that the field of view does not include the one or more salient portions; and determine in a subsequent instance to the first instance that the field of view includes the one or more salient portions, and in response thereto, decrease the multiplier used to calculate the variable panning speed in the subsequent instance in comparison to the multiplier used to calculate the variable panning speed in the non-salient instance.

16. The computer program product according to claim 13, wherein the image area has associated audio data and variable volumes associated with respective portions of the image area, wherein the modified panning speed varies in comparison to the user-provided panning speed based on a volume associated with the subset of the image area displayed in the field of view.

17. The computer program product according to claim 13, wherein the user input comprises at least a movement of a head, wherein the field of view is caused to move, at least for a duration of time, at a variable panning speed that is faster than the user-indicated panning speed such that the head need not turn as far to cause the one or more salient portions to be displayed in the field of view in comparison to if the variable panning speed was not used and the field of view only moved as directed by the user-indicated panning speed.

18. The computer program product according to claim 13, wherein the user input comprises a swiping input, wherein the field of view is caused to move, at least for a duration of time, at a variable panning speed that is faster than the user-indicated panning speed such that at least one of a length of the swiping input or a number of repetitions of the swiping input is reduced in comparison to if the variable panning speed was not used and the field of view only moved as directed by the user-indicated panning speed.

* * * * *